(12) United States Patent
Chen et al.

(10) Patent No.: US 7,673,252 B2
(45) Date of Patent: Mar. 2, 2010

(54) METHOD FOR PROTECTING A CHARACTER ENTERED AT A GRAPHICAL INTERFACE

(75) Inventors: Lim Yuen Chen, Singapore (SG); Michelle Li Hua Tan, Singapore (SG)

(73) Assignee: Netrust Pte Ltd, Singapore (SG), part interest ( * ) Notice: Subject to any disclaimer, the term of this patent is extended or adjusted under 35 U.S.C. 154(b) by 773 days.

(21) Appl. No.: 10/589,787

(22) PCT Filed: Feb. 11, 2005

(86) PCT No.: PCT/SG2005/000035

§ 371 (c)(1),
(2), (4) Date: Aug. 16, 2006

(87) PCT Pub. No.: WO2005/083638

PCT Pub. Date: Sep. 9, 2005

(65) Prior Publication Data

US 2007/0268160 A1 Nov. 22, 2007

(30) Foreign Application Priority Data

Mar. 2, 2004 (SG) ............................. 200400883-5

(51) Int. Cl.
*G06F 3/048* (2006.01)
*G06F 3/041* (2006.01)
*G09G 5/00* (2006.01)

(52) U.S. Cl. ...................... 715/773; 345/156; 345/173

(58) Field of Classification Search ................ 345/156, 345/168, 173; 341/23; 715/773
See application file for complete search history.

(56) References Cited

U.S. PATENT DOCUMENTS

| 6,005,588 A | | 12/1999 | Guha |
| 6,359,572 B1 | * | 3/2002 | Vale ............................ 341/23 |
| 6,434,702 B1 | * | 8/2002 | Maddalozzo et al. .......... 726/17 |
| 6,501,475 B1 | | 12/2002 | Cheng |
| 2002/0009211 A1 | * | 1/2002 | Braspenning et al. ....... 382/107 |
| 2002/0149587 A1 | | 10/2002 | Gorokhovik |
| 2004/0021691 A1 | * | 2/2004 | Dostie et al. ................ 345/773 |

FOREIGN PATENT DOCUMENTS

| JP | 8166865 A | 6/1996 |
| JP | 8287064 A | 11/1996 |

* cited by examiner

*Primary Examiner*—Bipin Shalwala
*Assistant Examiner*—Ilana Spar
(74) *Attorney, Agent, or Firm*—Beyer Law Group LLP

(57) ABSTRACT

The present invention provides a method for protecting a character entered at a graphical interface. The method comprises the steps of: generating a set of images that form a complete image of a keypad having a button-to-character assignment; displaying the graphical keypad using said image set; and, obtaining the character of a selected button using the button-to-character assignment. The inventive method can be repeated with a different button-to-character assignment in each repetition to obtain a sequence of characters. In consequence of the inventive method, the entered character is protected as monitoring software can capture merely unreadable portions of the complete keypad image. In furtherance of this purpose, the present invention also provides a method for generating a set of images from a complete image of a character belonging to a character set.

34 Claims, 5 Drawing Sheets

METHOD FOR PROTECTING A CHARACTER ENTERED AT A GRAPHICAL INTERFACE

FIELD OF THE INVENTION

This invention relates to the field of computer security and more particularly to a method and system for protecting a character entered at a graphical interface.

BACKGROUND OF THE INVENTION

Password is commonly required for enabling access across a network to an application hosted by a service provider. In a web-centric environment, a user of the service is required to enter his password into a textbox in the browser, which is then submitted to the server application using SSL for authentication. Unfortunately, this does not protect the password sufficiently as the client computer is vulnerable to security breach.

Monitoring software present in the client computer can be recording key-presses, mouse-clicks, and screenshots without the user's knowledge. This means that a hacker who has access to the monitoring software can steal the user's password, regardless of whether the password is entered using the keyboard or by clicking on a graphical keypad on the screen.

Publicly accessible computers, like those found in airports or internet cafes, are especially vulnerable to such hacking as users have neither control nor knowledge over what are installed on the computers. It is important, especially for the service provider, to secure client computers to prevent such hacking activity. In addition, other confidential user information, like user ID or account number, are also vulnerable.

Presently, the best technique to thwart such hacking activity is to use scanning software to scan for monitoring software and to detect key and mouse logging activities. The disadvantage of this technique is that the scanning software needs to be installed on the client computer. This may not always be possible as the service provider cannot dictate what is installed on the user's computer, or the user may be using a public terminal and has no permission to install anything. Another disadvantage is that the scanning software may need regular updating to function properly which can be a costly process. Hence, it can be seen that this technique is not a satisfactory solution.

The problem is therefore how to obtain password, or other confidential information, in such a way that is safe from the prying "eyes" of monitoring software.

SUMMARY OF THE INVENTION

The Invention described herein permits the user to decipher a keypad image while monitoring software can capture merely unreadable portions of the keypad image. In furtherance of this purpose, imaging techniques, including data partitioning and random distribution, are combined with the known capability of the human vision system to fuse dissimilar images into a single image.

Accordingly, the present invention provides a method of protecting a character entered at a graphical interface. The inventive method comprises the steps of: generating a set of images that form a complete image of a keypad having a button-to-character assignment; displaying said graphical keypad using said image set; and, obtaining the character of a selected button using said button-to-character assignment. The inventive method can be repeated with a different button-to-character assignment in each repetition to obtain a sequence of characters.

In consequence of the inventive method, the entered character is protected against monitoring software as monitoring software can capture merely unreadable portions of the complete keypad image.

In furtherance of this purpose, the present invention also provides a method of generating a set of images from a complete image of a character belonging to a character set. The inventive method comprises the steps of: computing the visible probabilities of all possibly illuminated pixels in a complete image; partitioning said pixels into groups based upon visible probability; and, distributing the illuminated pixels in said complete image among two or more images based upon pixel group.

The step of displaying the graphical keypad can comprise the step of displaying the images in the image set sequentially and cyclically at a fast refresh rate. In accordance with the displaying step, a strobed display of the complete keypad image is viewed by the user.

In an embodiment, the entered character sequence could represent confidential information, for example, password, account number, or user ID, and therefore the present invention could be implemented to protect entry of confidential information against monitoring software.

BRIEF DESCRIPTION OF THE DRAWINGS

There are presently shown in the drawings embodiments which are presently preferred, it being understood, however, that the invention is not limited to the precise arrangements shown.

DESCRIPTION OF THE PREFERRED EMBODIMENTS

The preferred embodiment is described in terms of an implementation of the inventive method in two network-connected applications, wherein the user uses a client application to enter a character sequence to a server application, although the invention could be implemented similarly in other environment, for example, in a single application or in several network-connected applications.

Figure 1:
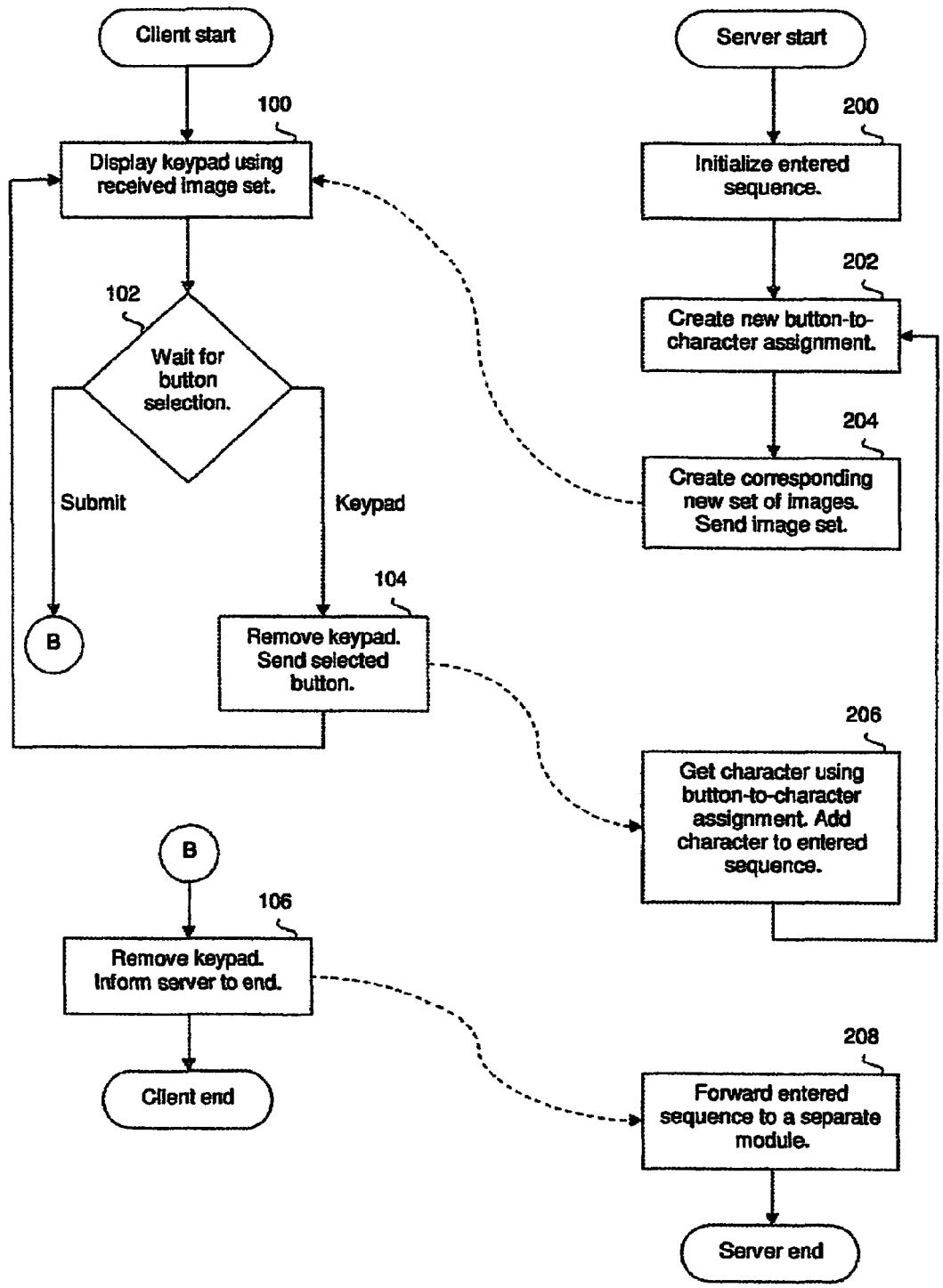
FIG. 1 is a flowchart illustrating the inventive method for protecting a character sequence entered at a graphical interface implemented in a client-server network environment.

FIG. 1 is a flowchart illustrating the inventive method for protecting a character sequence entered at a graphical interface in a client-server network environment. The method begins at step 200 after communication has been established between the client and server applications. In step 200, the server application initializes the entered character sequence to an empty string. It then creates, in step 202, a new button-to-character assignment. In step 204, it creates a set of images that form a complete image of a keypad having the button-to-character assignment and sends the newly created image set to the client application for display. After sending the images, the server application waits for the client application.

Figure 2:
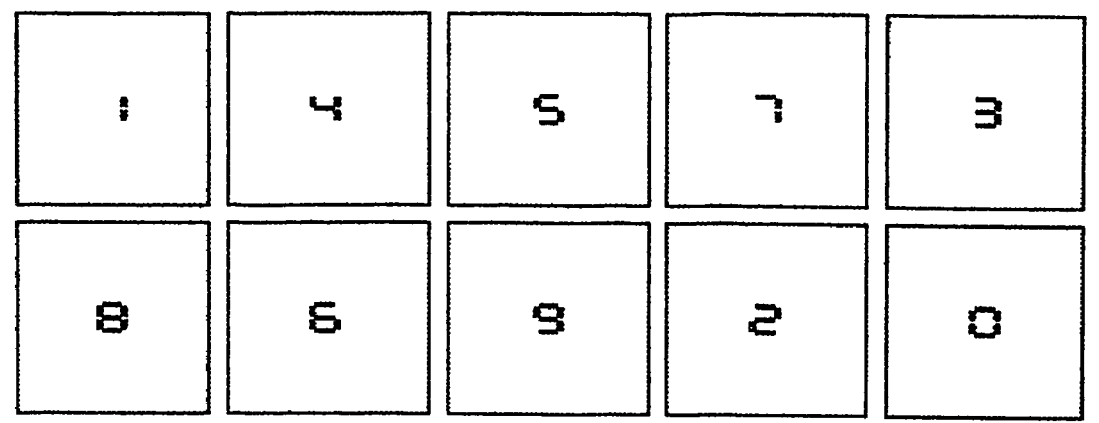
FIG. 2 illustrates an exemplary graphical keypad seen by the user.

FIG. 2 illustrates an exemplary complete image of a keypad having an exemplary button-to-character assignment. In the preferred embodiment, the character sequence comprises only numeric characters from "0" to "9". However, the present invention is not limited in this regard and could be implemented for any character sequence, alphanumeric or otherwise. In FIG. 2, the ten buttons are assigned to unique characters; the top left-hand corner button is assigned to character "1", the button next to its right is assigned to character "4", the next right button is "5", and so forth. The server application uses a random algorithm to randomly assign each button to a character in the preferred embodiment, although the present invention could be implemented using other assignment algorithm to perform step 202.

Figure 4:
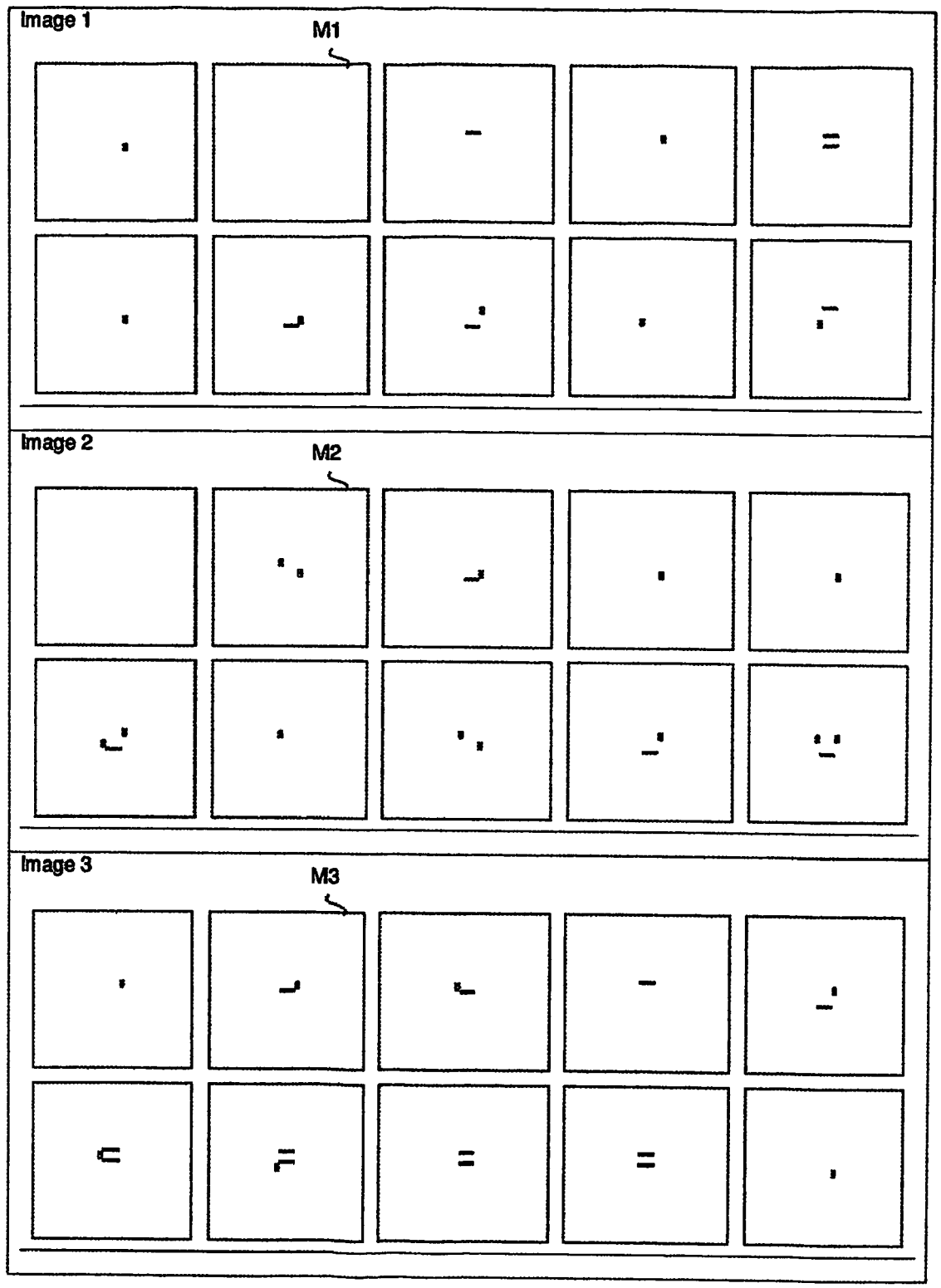
FIG. 4 illustrates an exemplary set of three images that could be sent to the client application for display.
Figure 5:
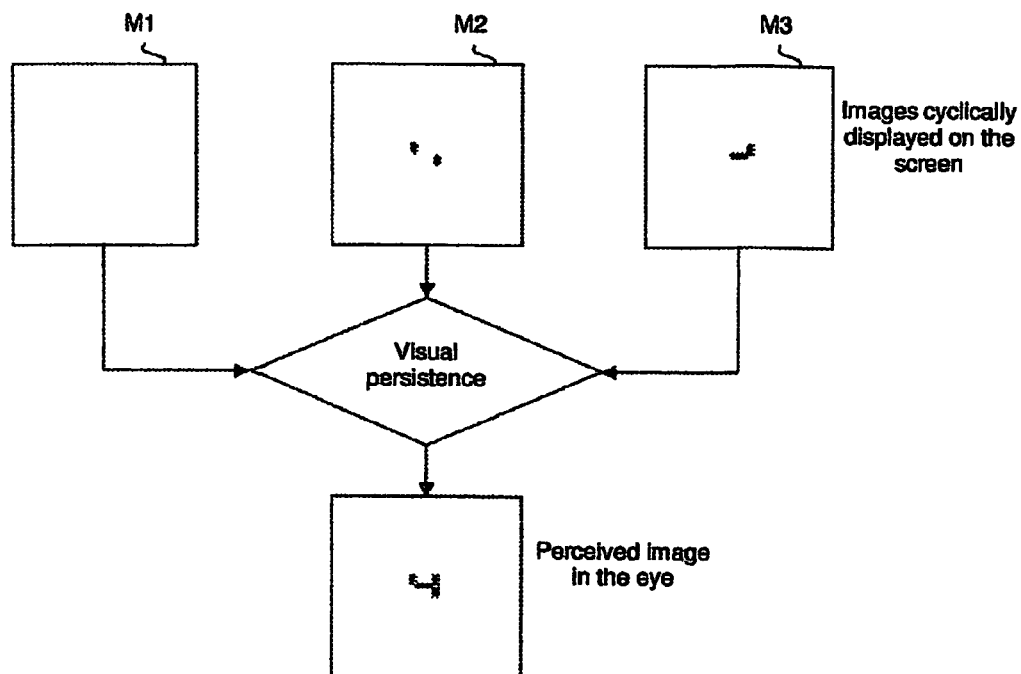
FIG. 5 illustrates the formation of the character "4" using visual persistence.

In step 100, the client application uses the received image set to display a graphical keypad to the user by employing the visual persistence of the human vision system to fuse dissimilar images into a single image. FIG. 4 illustrates an exemplary received image set comprising portions of the exemplary complete keypad image illustrated in FIG. 2. The client application sequentially and cyclically displays the three images in FIG. 4 at a fast refresh rate on its screen. By visual persistence, the cyclic pattern of images is integrated into a strobed display of the graphical keypad illustrated in FIG. 2. This integration is illustrated in FIG. 5 for the formation of the character "4" button in FIG. 2. The three images M1, M2 and M3 in FIG. 5 are obtained from the corresponding three images in FIG. 4.

In accordance with the present invention, the client application has no knowledge of the button-to-character assignment; it just displays whatever it receives. This reduces the security risk of exposing confidential information in the client application. The client screen does not display a complete keypad image at any one instance. Consequently, monitoring software can capture merely unreadable portions of the complete keypad image. Hence, when the user selects a keypad button, the entered character is safeguarded.

Specifically, a set of guidelines exist for displaying the images on the client screen while minimizing perceived flicker and eyestrain. The client application synchronizes each image drawing with the client monitor's vertical retrace period to prevent image tearing. The background and foreground colors of the keypad buttons are blue and red respectively in the preferred embodiment, although the present invention could be implemented in other colors. The number of images in an image set is three in the preferred embodiment, although the present invention could be implemented with other number of images. The number of images in an image set can be dependent on the monitor's refresh rate and the human vision system's integration time.

After displaying the graphical keypad, the client application waits for the user to select either a keypad button or a submit button in step 102. The user enters his first character by selecting a keypad button, using a mouse or other input means. The client application detects the keypad button selection and, in step 104, removes the graphical keypad from the client screen and informs the server application about the selected button by sending screen coordinates or other Identification means. In step 206, the server application obtains the entered character from the selected button using the button-to-character assignment and adds the selected character to the entered character sequence. The server application then abandons the existing button-to-character assignment. This ends the first cycle of steps performed to get the first character of the character sequence. Subsequently, for each remaining character in the character sequence, the cycle starts from step 202, wherein a new button-to-character assignment is created for the next character entry by the user.

Figure 3:
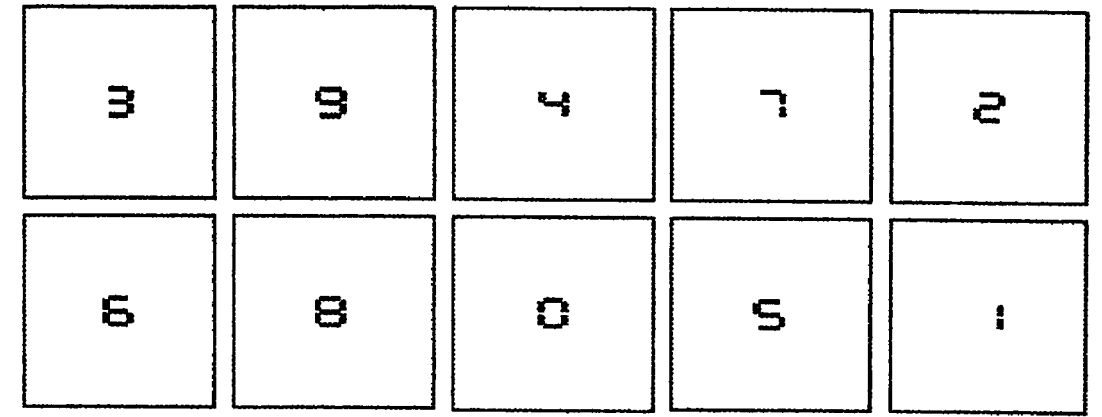
FIG. 3 illustrates an exemplary keypad with a different button-to-character assignment from that in FIG. 2.

In the inventive method, the button-to-character assignment changes randomly every time; this is illustrated in FIG. 3 which shows another exemplary keypad with a different button-to-character assignment from that in FIG. 2. Consequently, faithful reproduction of mouse clicks captured by monitoring software is useless.

The cycle ends when the user clicks on a submit button in step 102. The client application then, in step 106, informs the server application that no more characters will be entered, removes the displayed keypad, and terminates. In step 208, the server application forwards the entered character sequence to a separate module for processing and terminates.

In step 204 of FIG. 1, the server application generates a set of images that form a complete keypad image. Generally, the step of generating such image set can comprise the step of partitioning a complete keypad image into portions showing partial keypad information. The present invention does not limit the algorithm that could be used for generating such image set. Specifically, the present invention provides a method (hereinafter "inventive method for pixel distribution" for generating a set of images from a complete image of a character belonging to a character set.

The inventive method for pixel distribution is described in terms of the implementation of the preferred embodiment, wherein a seven-segment character display mechanism is employed, although the invention could be implemented similarly in other display mechanisms, for example, bit-mapped font rendering.

Figure 7:
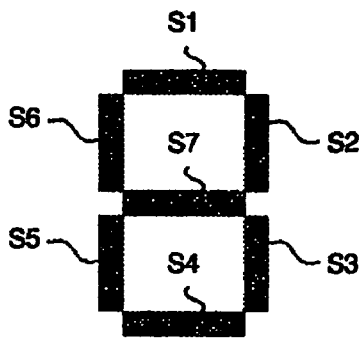
FIG. 7 is an exemplary pattern that illustrates a typical character display mechanism used in commercially available seven-segment LED display.

As illustrated in FIG. 2 and FIG. 5, the preferred embodiment uses a seven-segment character display mechanism, illustrated in FIG. 7, to display the ten characters in the keypad. In the seven-segment character display mechanism, some of the seven segments in FIG. 7, from S1 to S7, are illuminated on a screen to display a character. It can be seen that the seven segments effectively comprise all the possibly illuminated pixels in a complete image of a character.

Figure 8:
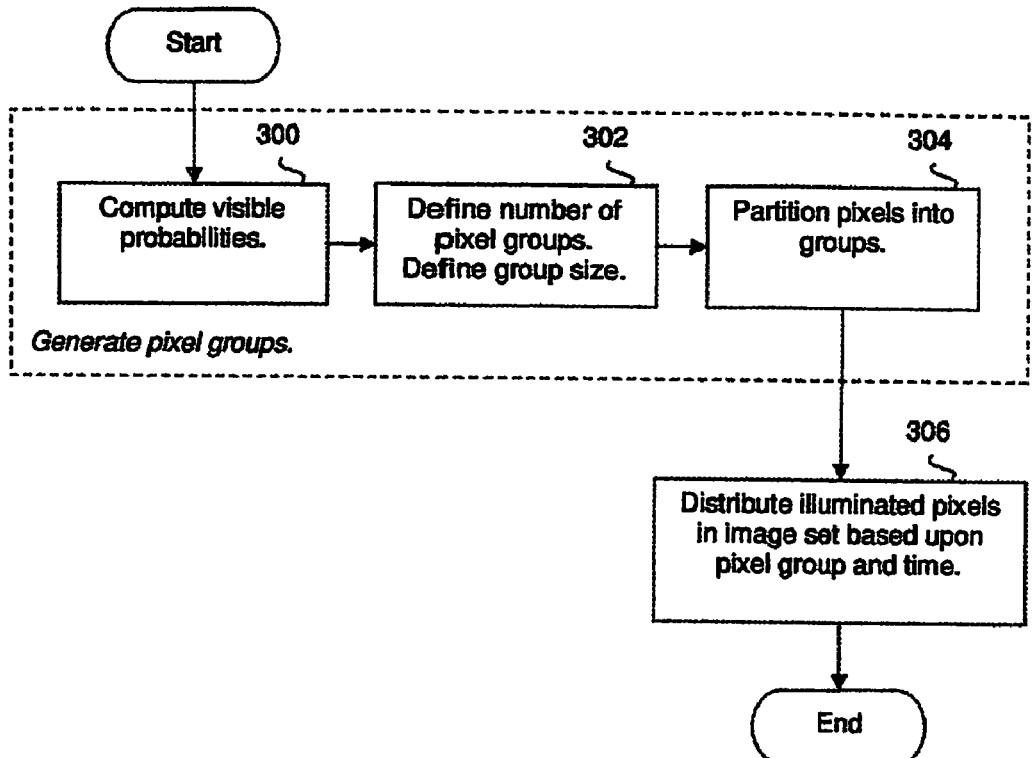
FIG. 8 is a flowchart illustrating the inventive method for pixel distribution.

The flowchart in FIG. 8 illustrates the inventive method for pixel distribution. The method starts by partitioning the possibly illuminated pixels of the employed character display mechanism into pixel groups. In step 300, the visible probability of each possibly illuminated pixel is computed. The visibility probability of a possibly illuminated pixel is the likelihood that the possibly illuminated pixel is illuminated when a character is displayed. In step 302, the number of pixel groups is defined as the closest integer that is greater than or equal to the decimal quotient obtained from dividing the number of possibly illuminated pixels by the number of images in an image set. The size of each pixel group is initialized to the number of images in an image set. If the sum of the size of all the pixel groups is greater than the number of possibly illuminated pixels, then a number of pixel groups equal to the difference are reduced in size by one. If not, the pixel groups retain their initial size. The possibly illuminated pixels are now assigned to the empty pixel groups. In step 304, each pixel group, in descending order of size, is given the possibly illuminated pixel with the next highest visible probability until the group is full.

Figure 9:
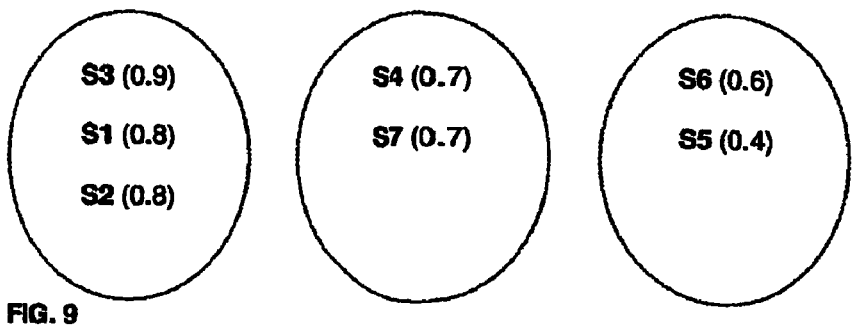
FIG. 9 illustrates the pixel groups generated for the seven-segment character display mechanism.

In the preferred embodiment, according to steps 300, 302 and 304, the three pixel groups, as illustrated in FIG. 9, are obtained. The labels S1 to S7 refer to the seven possibly illuminated pixels in the employed display mechanism illustrated in FIG. 7, and the numbers in brackets are the visible probabilities of each possibly illuminated pixel.

After the pixel groups for the employed display mechanism are generated, the method distributes the illuminated pixels in a given complete image of a character among an image set of empty images in step 306. The method randomly places illuminated pixels into images while ensuring each Illuminated pixel in an image comes from a different pixel group.

Figure 6:
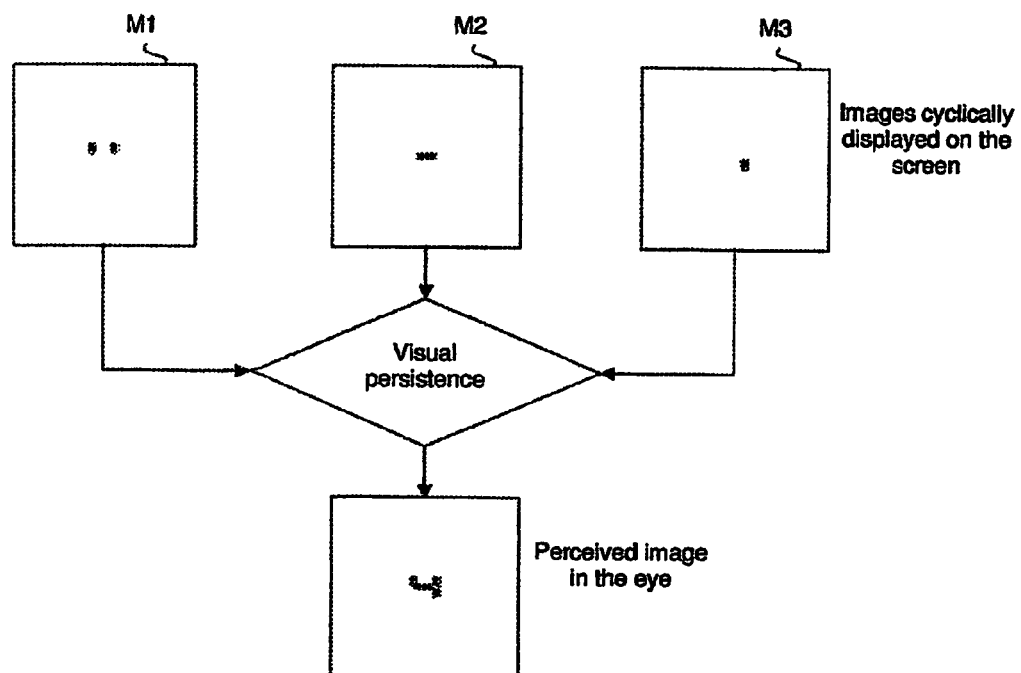
FIG. 6 illustrates the formation of the character "4" with a different pixel distribution from that in FIG. 5.

FIG. 5 illustrates an exemplary illuminated pixel distribution for the character "4". The illuminated pixels in the complete image of this character are S2, S3, S6 and S7 according to FIG. 7. Based upon the pixel groups in FIG. 9, S2 and S3 are from the same group and, therefore, appear in two different images M3 and M2 respectively. In accordance with the inventive method for pixel distribution, the pixel distribution randomly changes each time step 306 is executed. This is illustrated in FIG. 6 which shows a different exemplary pixel distribution for the same character "4".

In consequence of the inventive method for pixel distribution, it is difficult to determine the character represented by an image set through examining one of the images since the pixel distribution for the character changes randomly and infrequently-used possibly illuminated pixels are not found in the same image.

In general, the inventive method for pixel distribution is used for displaying character securely. In the preferred embodiment, the inventive method for pixel distribution is used on the characters in a keypad to produce a set of images that form a complete image of the keypad.

What is claimed is:

1. A method for protecting a character entered at a graphical interface, said method comprising the steps of:
    generating a set of partial images that are generated from complete images of characters belonging to a character set that form a complete image of a keypad having a button-to-character assignment;
    displaying the partial images in said set cyclically to form a graphical keypad having the complete image; and
    obtaining the character of a button selected by a user on said graphical keypad using said button-to-character assignment.

2. The method of claim 1, further comprising:
    repeating said generating, said displaying, and said obtaining in claim 1 to obtain another character from the user.

3. The method of claim 1, wherein said generating comprises: distributing illuminated pixels in said complete image of a character among two or more partial images based upon pixel group.

4. The method of claim 1, wherein a partial image in the generated image set contains complete, partial or no information of said complete image of said keypad.

5. The method of claim 3, wherein said generating further comprises:
    changing said distribution based upon time.

6. The method of claim 3, wherein said generating further comprises:
    computing the visible probabilities for all possibly illuminated pixels in a complete image; and
    partitioning said pixels into groups based upon visible probability.

7. A computer system for protecting a character entered at a graphical interface, said system comprising:
    means for generating a set of partial images that are generated from complete images of characters belonging to a character set that form a complete image of a keypad, having a button-to-character assignment;
    means for displaying the partial images in said set cyclically to from a graphical keypad having the complete image: and
    means for obtaining the character of a button selected by a user on said graphical keypad using said button-to-character assignment.

8. The computer system of claim 7, further comprising:
    means for repeating operations of said means for generating, said means for displaying, and said means for obtaining in claim 7 to obtain another character from the user.

9. A computer-readable storage medium having stored therein instructions for performing a method of protecting a character entered at a graphical interface, the method comprising the steps of:
    generating a set of partial images that are generated from complete images of characters belonging to a character set that form a complete image of a keypad, having a button-to-character assignment;
    displaying the partial images in said set cyclically to form a graphical keypad having the complete image; and
    obtaining the character of a button selected by a user on the said graphical keypad using said button-to-character assignment.

10. The computer-readable storage medium of claim 9, wherein said method further comprises:
    repeating said generating, said displaying, and said obtaining in claim 9 to obtain another character from the user.

11. The computer system of claim 7, wherein said set of partial images is generated from a complete image of a character belonging to a character set, wherein said means for generating further comprises:
    means for distributing illuminated pixels in said complete image among two or more partial images based upon pixel group.

12. The computer system of claim 11, wherein said means for generating further comprises:
    means for computing the visible probabilities for all possibly illuminated pixels in a complete image; and
    means for partitioning said pixels into groups based upon visible probability.

13. The computer-readable storage medium of claim 9, wherein said generating comprises:
    distributing illuminated pixels in said complete image among two or more partial images based upon pixel group.

14. The computer-readable storage medium of claim 13, wherein said generating further comprises:
    computing the visible probabilities for all possibly illuminated pixels in a complete image; and
    partitioning said pixels into groups based upon visible probability.

15. A system for protecting a character entered at a graphical interface, said system comprising:
    a network of computers;
    means for generating a set of partial images that are generated from complete images of characters belonging to a character set that form a complete image of a keypad, having a button-to-character assignment;
    means for displaying the partial images in said set cyclically to form a graphical keypad having the complete image; and
    means for obtaining the character of a button selected by a user on said graphical keypad using said button-to-character assignment.

16. The system of claim 15, wherein said means for generating and said means for obtaining are provided by a computer in said network, and said means for displaying is provided by another computer in said network.

17. The system of claim 15, wherein said means for generating, said means for displaying, and said means for obtaining are provided by multiple computers in said network working together to perform a method for protecting a character entered at a graphical interface, with each computer performing at least one of the following steps of:
   generating a set of partial images that form a complete image of a keypad having a button-to-character assignment;
   displaying the partial images in said image set cyclically to form a graphical keypad having the complete image; and
   obtaining the character of a button selected by a user on the said graphical keypad using said button-to-character assignment.

18. The system of claim 15, further comprising:
   means for repeating operation of said means for generating, means for displaying, and means for obtaining in claim 15, to obtain another character from the user.

19. A computer-readable storage medium having stored therein instructions for performing a method of protecting a character entered at a graphical interface, said method comprising the steps of:
   generating a set of partial images that are generated from complete images of characters belonging to a character set that form a complete image of a keypad having a button-to-character assignment;
   sending said set of partial images to a remote computer;
   receiving a button selected by a user on a graphical keypad from said remote computer, the graphical keypad having the complete image formed from the set of the partial images; and
   obtaining the character of said selected button using said button-to-character assignment.

20. The computer-readable storage medium of claim 19, wherein said method further comprises:
   repeating said generating, said sending, said receiving, and said obtaining in claim 19 to obtain another character form the user.

21. A computer-readable storage medium having stored therein instructions for performing a method of protecting a character entered at a graphical interface, said method comprising the steps of:
   receiving a set of partial images from a remote computer, the set of partial images being generated from complete images of characters belonging to a character set and forming a complete image of a keypad, having a button-to-character assignment;
   displaying the partial images in said set cyclically to form a graphical keypad having the complete image; and
   sending a button selected by a user on said graphical keypad to said remote computer.

22. The computer-readable storage medium of claim 21, wherein said performed method further comprises:
   repeating said receiving, said displaying, and said sending in claim 21, to obtain another character from the user.

23. The method of claim 1, wherein each character is composed of a plurality of segments, said generating comprising:
   distributing the segments of each character into two or more partial images of the set.

24. The computer system of claim 7, wherein a partial image in the generated image set contains complete, partial or no information of said complete image.

25. The computer system of claim 7, wherein each character is composed of a plurality of segments, said means for generating comprising:
   means for distributing the segments of each character into two or more partial images of the set.

26. The computer system of claim 11, wherein said means for generating further comprises means for changing said distribution based upon time.

27. The computer-readable storage medium of claim 9, wherein each character is composed of a plurality of segments, said generating comprising:
   distributing the segments of each character into two or more partial images of the set.

28. The system of claim 15, wherein said set of partial images is generated from a complete image of a character belonging to a character set, wherein said means for generating further comprises:
   means for distributing illuminated pixels in said complete image among two or more partial images based upon pixel group.

29. The system of claim 28, wherein said means for generating further comprises:
   means for changing said distribution based upon time.

30. The system of claim 28, wherein said means for generating further comprises:
   means for computing the visible probabilities for all possibly illuminated pixels in a complete image; and
   means for partitioning said pixels into groups based upon visible probability.

31. The system of claim 15, wherein a partial image in the generated image set contains complete, partial or no information of said complete image.

32. The system of claim 15, wherein each character is composed of a plurality of segments, said means for generating comprising:
   means for distributing the segments of each character into two or more partial images of the set.

33. The computer-readable storage medium of claim 19, wherein each character is composed of a plurality of segments, said generating comprising:
   distributing the segments of each character into two or more partial images of the set.

34. The computer-readable storage medium of claim 21, wherein each character is composed of a plurality of segments, and wherein the segments of each character are distributed into two or more partial images of the set.

* * * * *